US011693134B2

(12) United States Patent
Behar et al.

(10) Patent No.: US 11,693,134 B2
(45) Date of Patent: Jul. 4, 2023

(54) SYSTEM AND METHOD FOR DIRECTIONAL DETECTION OF RADIATION

(71) Applicants: Technion Research & Development Foundation Limited, Haifa (IL); Nuclear Research Center—Negev, Arava (IL)

(72) Inventors: Ehud Behar, Haifa (IL); Shlomit Tarem, Haifa (IL); Lee Yacobi, Haifa (IL); Roi Rahin, Haifa (IL); Alon Osovizky, Lehavim (IL); Max Ghelman, Beer-Sheva (IL)

(73) Assignees: Technion Research & Development Foundation Limited, Haifa (IL); Nuclear Research Center—Negev, Arava (IL)

( * ) Notice: Subject to any disclaimer, the term of this patent is extended or adjusted under 35 U.S.C. 154(b) by 0 days.

(21) Appl. No.: 17/679,164

(22) Filed: Feb. 24, 2022

(65) Prior Publication Data
US 2022/0268953 A1    Aug. 25, 2022

Related U.S. Application Data

(60) Provisional application No. 63/152,860, filed on Feb. 24, 2021.

(51) Int. Cl.
*G01T 1/29* (2006.01)
*G01T 1/36* (2006.01)
*G01T 1/202* (2006.01)
*G01T 1/20* (2006.01)

(52) U.S. Cl.
CPC .......... *G01T 1/2907* (2013.01); *G01T 1/2018* (2013.01); *G01T 1/2023* (2013.01); *G01T 1/362* (2013.01)

(58) Field of Classification Search
CPC ... G01T 1/2907; G01T 1/2018; G01T 1/2023; G01T 1/362
See application file for complete search history.

(56) References Cited

U.S. PATENT DOCUMENTS

2017/0336519 A1\* 11/2017 Frazao ................. G01T 1/2006

OTHER PUBLICATIONS

Spanoudaki et al. "Scintillation Induced Response in Passively-Quenched Si-Based Single Photon Counting Avalanche Diode Arrays", Optics Express, 19(2): 1665-1679, Jan. 13, 2011.
(Continued)

*Primary Examiner* — David P Porta
*Assistant Examiner* — Mamadou Faye

(57) ABSTRACT

A system for directional detection of radiation, comprises a plurality of scintillating crystals, responsive to the radiation and being arranged three-dimensionally, with voids between adjacent crystals, such that there are crystals that are inner and crystals that are outer within the arrangement. The system also comprises a plurality of light sensors coupled to the crystals for receiving optical signals from the crystals and responsively generating electrical signals, and a data processor receiving an electrical signal separately from each light sensor and calculating a direction of the radiation based on relative intensities of the signals and mutual occultation among different crystals.

20 Claims, 11 Drawing Sheets

(56) References Cited

OTHER PUBLICATIONS

Balamurugan et al. "Growth and characterization of undoped and thallium doped cesium iodide single crystals", Journal of Crystal Growth, 286(2): 249-299,15, Jan. 2006.
Barthelmy et al. "The Burst Alert Telescope (BAT) on the Swift Mixed Mission", Space Science Reviews,120: 143-164, 2005.
Fiore et al. "HERMES: A Swarm of Nano-Satellites for High Energy Astrophysics and Fundamental Physics", Proceedings. SPIE 10699, Space Telescopes and Instrumentation, Ultraviolet to Gamma Ray, 106992Q: Jul. 9, 2018. Abstrract.
Fishman et al. "Burst and Transient Source Experiment (BATSE) for the Gamma Ray Observatory (GRO)", 19th International Cosmic Ray Conference3: 343-346, 1985.
Hirade et al. "Annealing of Proton Radiation Damages in Si-PM at Room Temperature", Science Direct, 986: 35P.,, Jan. 11, 2021.
Kamada et al. "2 inch Diameter Single Crvstal Growth and Scintillation Properties of Ce:Gd3Al2Ga3O12", Journal of Crystal Growth, 352(1): 88-90, Aug. 1, 2012.
1 Sibczynski e t al. "Characterization of Some Modern Scintillators Recommended for Use on Large fFsion Facilities in ]-Ray Spectroscopy and Tomographic Measurements of y-Emission Profiles", Nukleonika, ;62(3):223[228, Jan. 25, 2017.
Link et al. "Silicon Photomultiplier Use in Particle Astrophysics and Hehiophysics Missions", 36th International Cosmic Ray Conference: 9P., Jul. 2019.
Meegan et al. "The Fermi Gamma-Ray Burst Monitor", The Astrophysical Journal, 702:791-804,Sep. 1, 2009.
Ripa et al. "Estimation of the Detected Background by the Future gamma Ray Transient Mission CAMELOT", Astronomical Notes, 340(7), Special Issue: Integral/Bart Workshop (IBWS): 666-673, Oct. 10, 2019.
Virginia et al. "Scintillation Induced Response in Passively-Quenched Si-Based Single Photon Counting Svalanche Diode Arrays", Optics Express, 19(2): 1665-1679. Jan. 13, 2011.
Yacbi et al. "The Gamma-Ray Transient Monitor for ISS-TAO: New Directional Capabilities", Proceedings, 10699, Space Telescopes and Instrumentation: 9P., Jul. 6, 2018.
Yamamoto et al. "Recent Development of MPPC at Hamamatsu for Photon Counting Applications", Proceedings of the 5th International Workshop on New Photon-Detectors (PD18),JPS Journals, 27, 011001: 6.P, 2019.
Yoneyama et al. "Evaluation of GAGG:Ce Scintillators for Future Space Applications" Journal of Instrumentation, 13(02): 1-25, Feb. 21, 2018.

\* cited by examiner

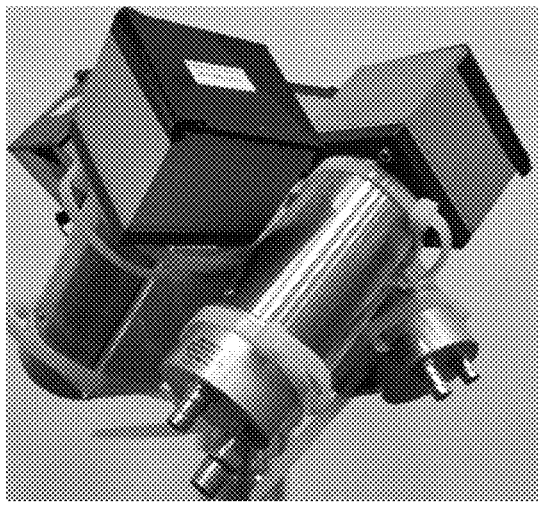
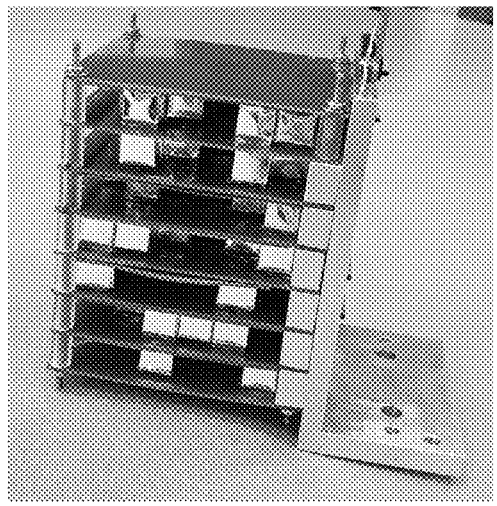
FIG. 1A                    FIG. 1B

SYSTEM AND METHOD FOR DIRECTIONAL DETECTION OF RADIATION

RELATED APPLICATION

This application claims the benefit of priority of U.S. Provisional Patent Application No. 63/152,860 filed on Feb. 24, 2021, the contents of which are incorporated herein by reference in their entirety.

FIELD AND BACKGROUND OF THE INVENTION

The present invention, in some embodiments thereof, relates to radiation detection and, more particularly, but not exclusively, to a system and method for directional detection of radiation.

Small-scale radiation detectors are based on scintillating crystals (scintillators) attached to light sensing photomultiplier tubes (PMTs) for reading out the scintillation signal. In traditional detectors, the scintillators are tile-shaped, having different cross-sections towards different directions, thus producing a gradually varying response with angle. These detectors rely on each scintillator facing a different orientation to reconstruct the direction of the source.

Silicon photomultipliers (SiPMs) are known solid-state photo sensors that have been developed for very low-level light sensing applications. They include an array of microcells, which are each operated in so-called Geiger mode. U.S. Published Application No. 20160266260 discloses a silicon photomultiplier (SiPM) based radiation detector to detect radiation. The detector includes a number of detector assemblies, each including a scintillator providing light to a corresponding SiPM in response to ionizing radiation entering the scintillator.

SUMMARY OF THE INVENTION

According to some embodiments of the invention the present invention there is provided a system for directional detection of radiation. The system comprises: a plurality of scintillating crystals, responsive to the radiation and being arranged three-dimensionally, with voids between adjacent crystals, such that there are crystals that are inner and crystals that are outer within the arrangement; a plurality of light sensors coupled to the crystals for receiving optical signals from the crystals and responsively generating electrical signals; and a data processor having a circuit configured for receiving an electrical signal separately from each light sensor, and calculating at least a direction of the radiation based on relative intensities of the signals and mutual occultation among different crystals.

According to some embodiments of the invention at least one of the light sensors, for example, each of the light sensors, is a solid state photomultiplier.

According to some embodiments of the invention each of at least a few of the crystals has a volumetric aspect ratio of less than about 3, more preferably less than about 2.5, more preferably less than about 2, more preferably less than about 1.5.

According to some embodiments of the invention a largest diameter of at least a few of the crystals is less than 50 mm, more preferably less than 40 mm, more preferably less than 30 mm, more preferably less than 20 mm, more preferably less than less than 15 mm.

According to some embodiments of the invention at least one of the crystals is at least partially coated by a material that is reflective to the radiation.

According to some embodiments of the invention each scintillating crystal is coupled to one solid state photomultiplier.

According to some embodiments of the invention each scintillating crystal is coupled to more than one solid state photomultiplier.

According to some embodiments of the invention at least one of the scintillating crystals is selected from the group consisting of CsI(Tl), Ce:GAGG, NaI(Tl), $LaBr_3(Ce)$, $CeBr_3$, and CLYC.

According to some embodiments of the invention at least one of the solid state photomultipliers comprises a silicon photomultiplier.

According to some embodiments of the invention the circuit of the data processor is also configured for determining a spectrum of the radiation.

According to some embodiments of the invention the scintillating crystals are responsive to gamma radiation.

According to some embodiments of the invention the scintillating crystals are responsive to beta radiation.

According to some embodiments of the invention the scintillating crystals are responsive to alpha radiation.

According to an aspect of some embodiments of the present invention there is provided a medical imaging system, which comprises the system as delineated above and optionally and preferably as further detailed below.

According to an aspect of some embodiments of the present invention there is provided an autonomous radiation detector, which comprises an autonomous vehicle and the system as delineated above and optionally and preferably as further detailed below.

According to some embodiments of the invention the system is mounted on a satellite.

According to an aspect of some embodiments of the present invention there is provided a method of decontaminating a region. The method comprises detecting radiation direction using the system as delineated above and optionally and preferably as further detailed below, locating a radiation source based on the direction, and decontaminating or isolating the radiation source.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

It is expected that during the life of a patent maturing from this application many relevant solid-state photomultipliers will be developed and the scope of the term solid state photomultiplier is intended to include all such new technologies a priori.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings.

With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A and 1B are images showing two prototype systems used in experiments performed according to some embodiments of the present invention. FIG. 1A shows a traditional design based on large, asymmetric tile-shaped scintillators with various orientations. This design is similar to the Fermi/GBM. The FIG. 1B shows the GALI design, which uses 9 mm³ cubic scintillators in a 3D structure that exploits their different mutual occultation from different directions.

Figure 2A:
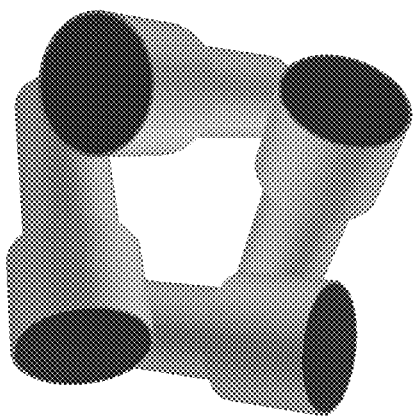
Figure 2B:
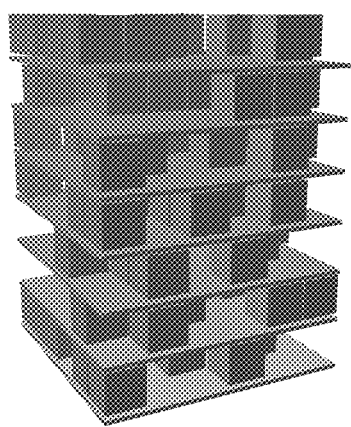
Figure 2C:
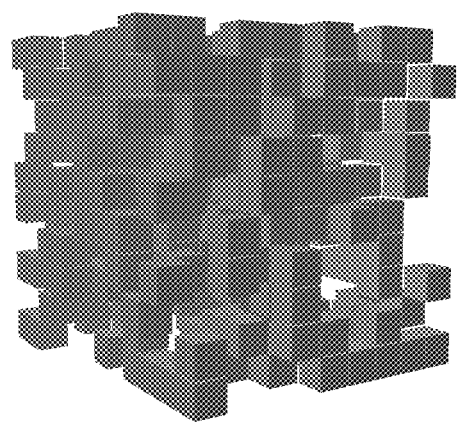

FIGS. 2A, 2B and 2C show three detector configurations compared using simulations. FIG. 2A: A configuration of four 3" diameter 1" thick cylindrical detectors—the GTM. FIG. 2B: A GALI configuration of ninety 9 mm³ cubic scintillators. Between the detectors are PCB boards. FIG. 2C: A GALI configuration of 350 9 mm³ cubic scintillators.

Figure 3A:
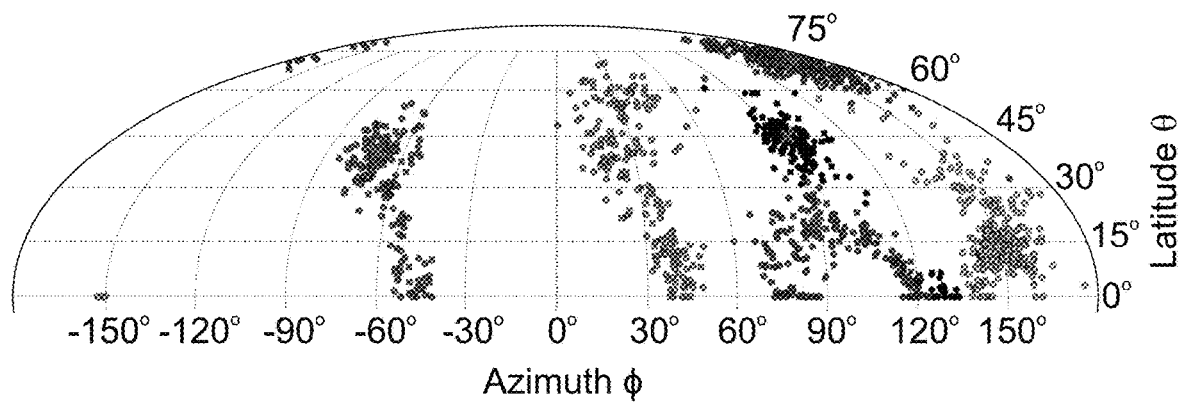
Figure 3B:
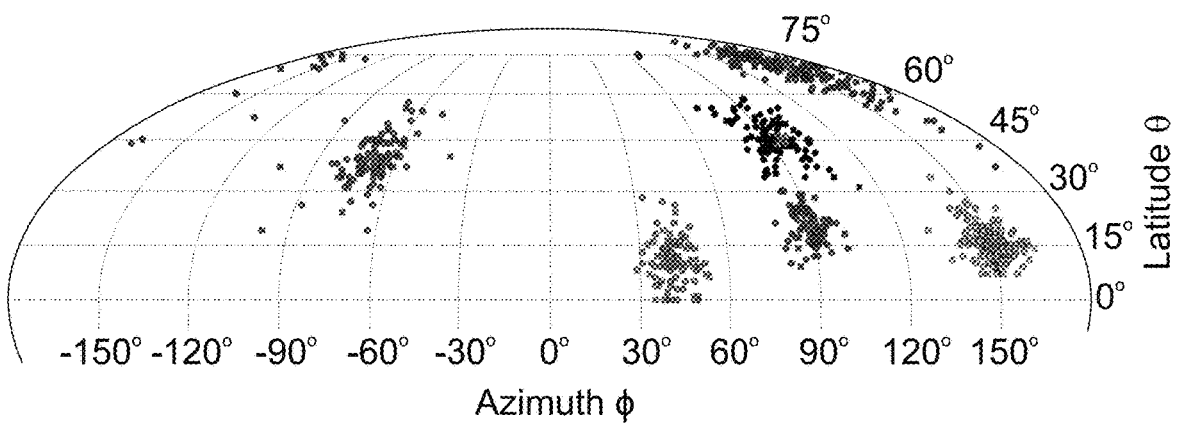
Figure 3C:
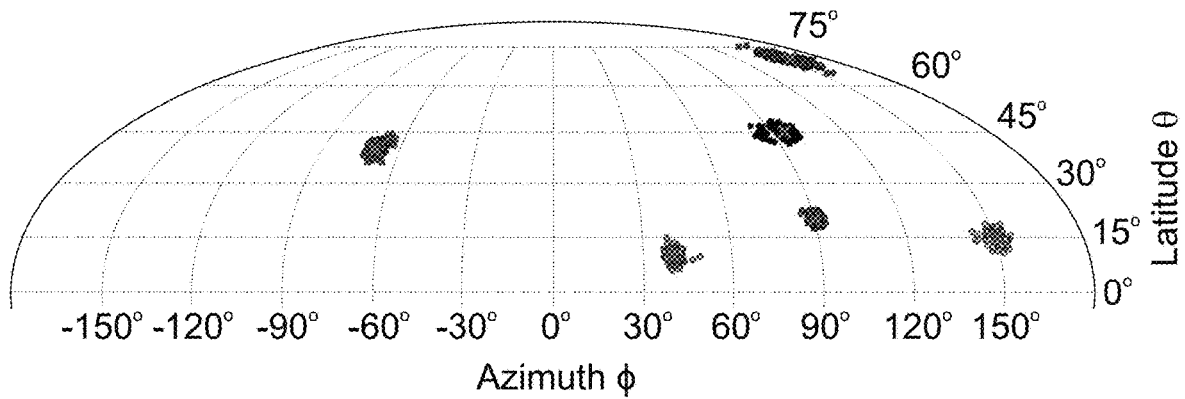

FIGS. 3A, 3B and 3C show a comparison between the simulation-generated GRBs direction (cosmic gamma-ray bursts) reconstructed by different detector configurations. Each dot represents a 1 s burst of 10 phcm$^{-2}$s$^{-1}$ at Low Earth Orbit. Dots are grouped by color according to the actual burst direction, which is represented by a cross mark. FIG. 3A: GTM. FIG. 3B: 90-scintillator GALI. FIG. 3C: 350-scintillator GALI. Notice the clear improvement in localization accuracy over the traditional design, and when the number of scintillators is increased.

Figure 4A:
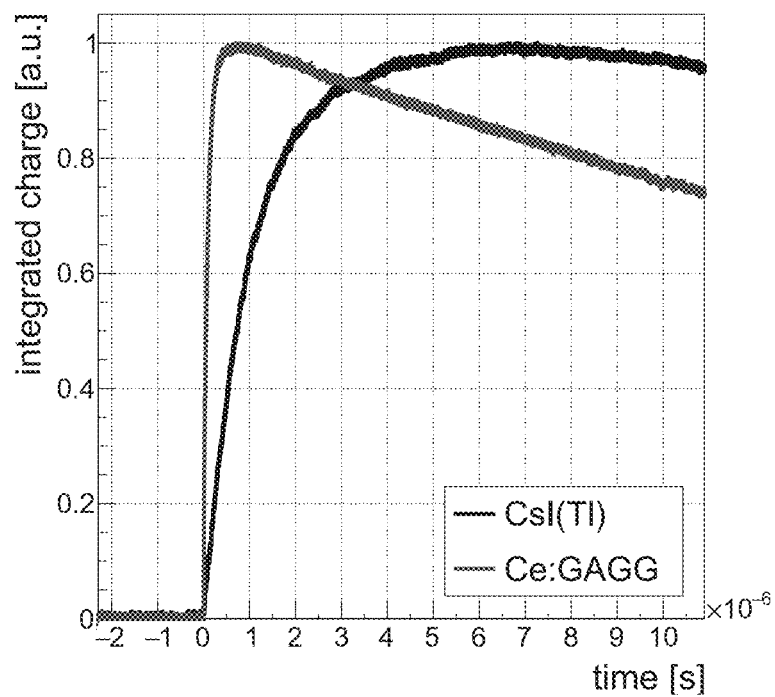
Figure 4B:
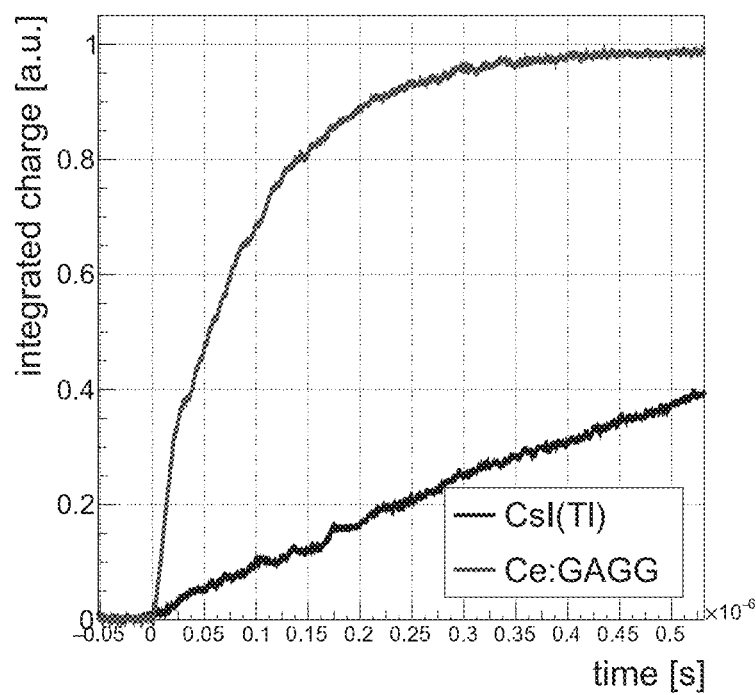

FIGS. 4A and 4B show gamma-ray signals from CsI(Tl) and Ce:GAGG crystals read by a SiPM coupled to ground through a 10 kΩ resistor. FIG. 4B shows the first 500 ns of FIG. 4A. The measured voltage is proportional to the integrated charge produced by the SiPM. The peak corresponds to the end of the light production, which is faster for Ce:GAGG. The voltage recovery follows the circuit RC value.

Figure 5:
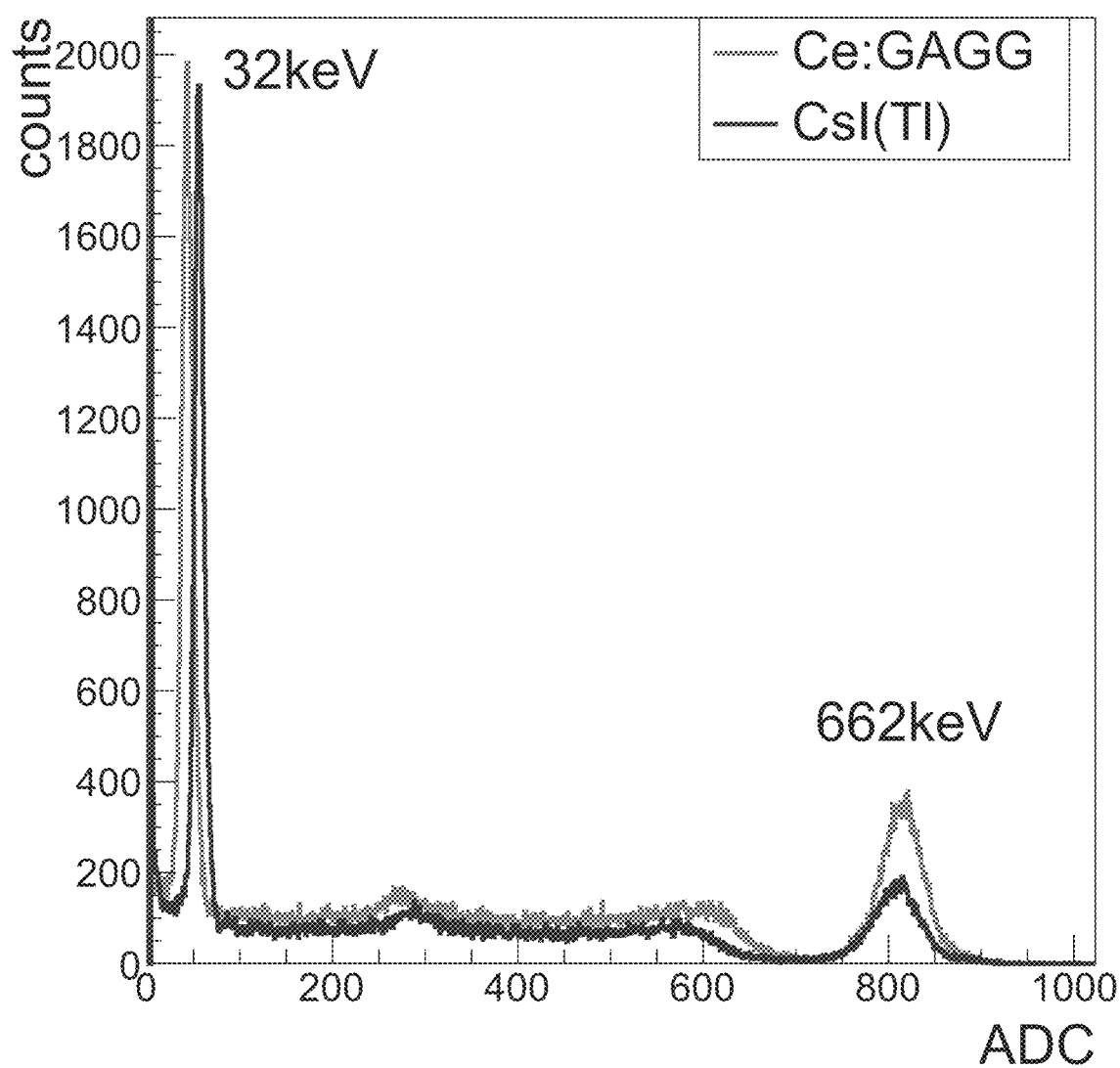

FIG. 5 shows spectra from a $^{137}$Cs source detected by 9 mm³ CsI(Tl) and Ce:GAGG cubic scintillators. The 662 keV peaks show the higher detection efficiency of Ce:GAGG at high energies.

Figure 6A:
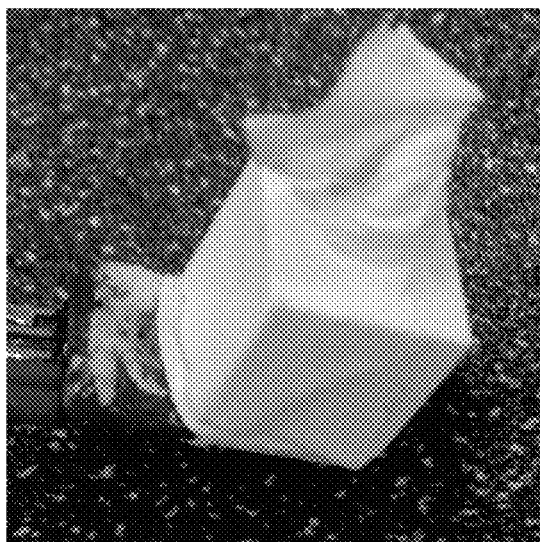
Figure 6B:
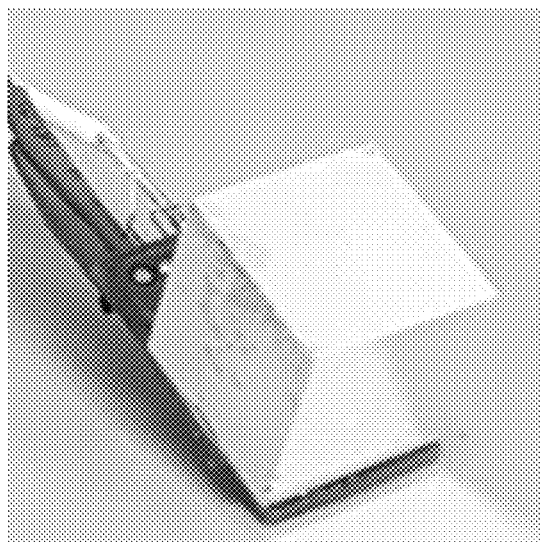
Figure 7A:
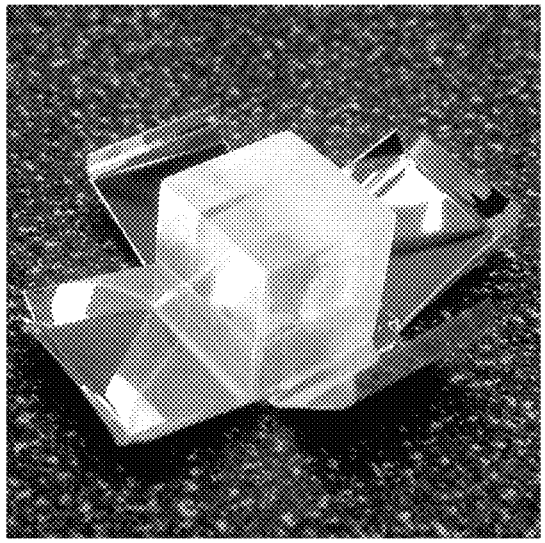
Figure 7B:
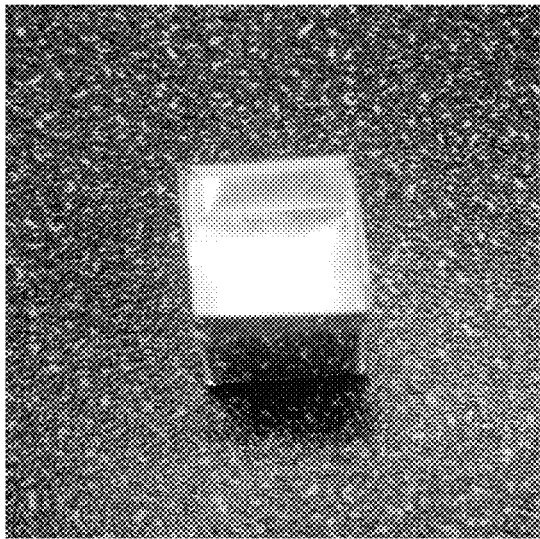
Figure 7C:
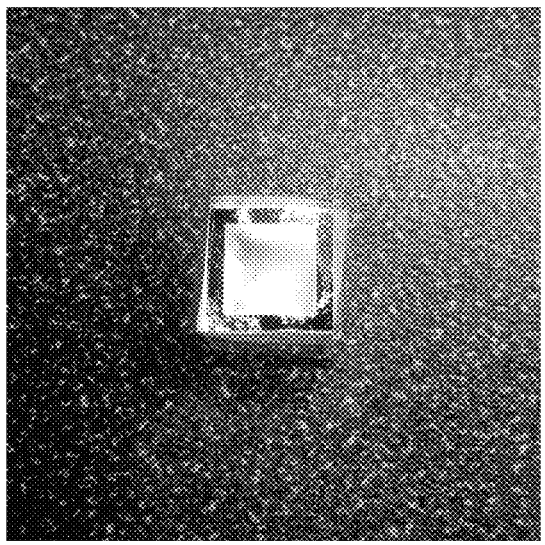
Figure 7D:
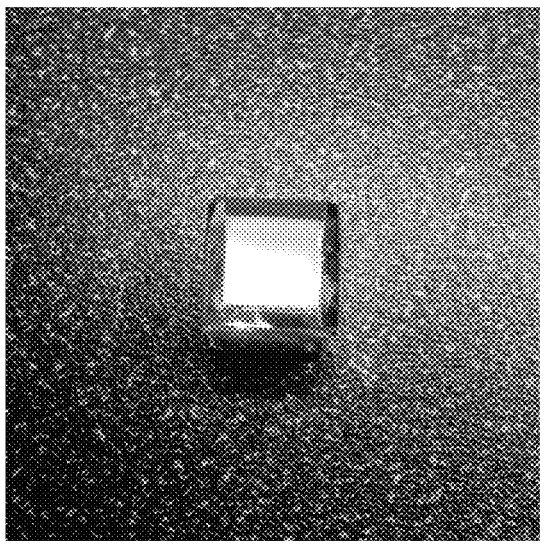

FIGS. 6A and 6B are images showing a CsI(Tl) crystal coupled to a SiPM and then wrapped in Teflon tape (FIG. 6A), and a CsI(Tl) crystal coated with Al and Ag and coupled to a SiPM (FIG. 6B).

FIGS. 7A, 7B, 7C and 7D show, respectively, a sequential wrapping process of a CsI(Tl) crystal with Vikuiti ESR.

Figure 8:
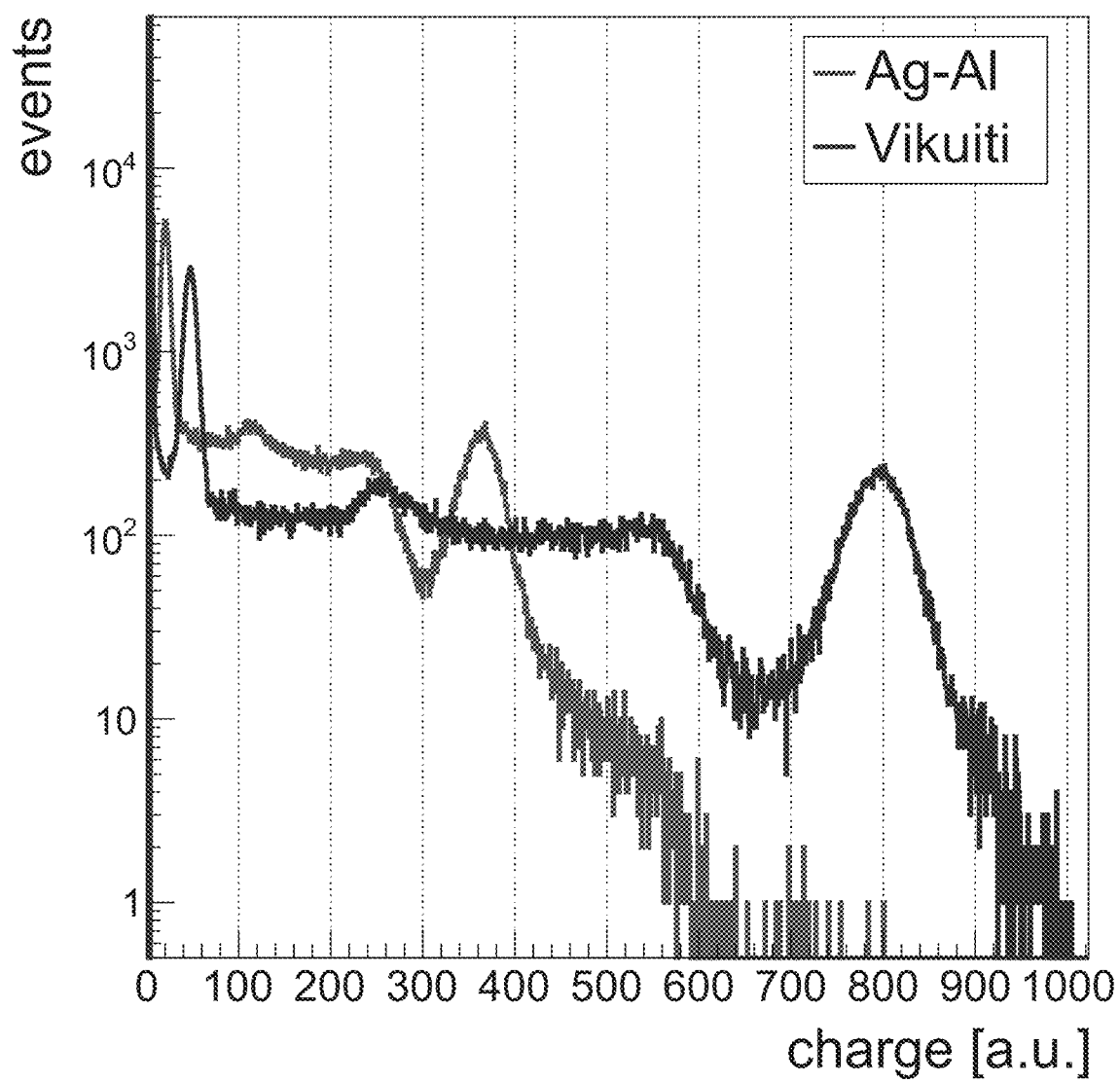

FIG. 8 shows a comparison of a $^{137}$Cs spectrum measured by a CsI(Tl) crystal coated with Ag and then Al, and one measured by a Vikuiti ESR wrapped crystal. The light transport in the coated crystal results in noticeably less charge.

Figure 9A:
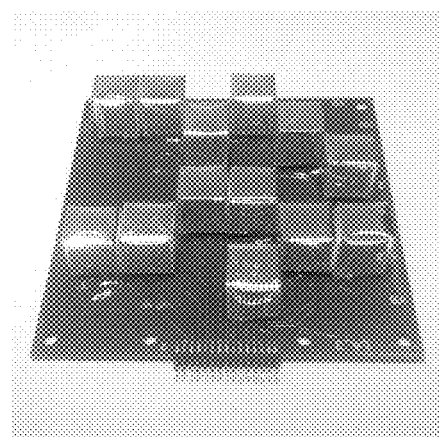
Figure 9B:
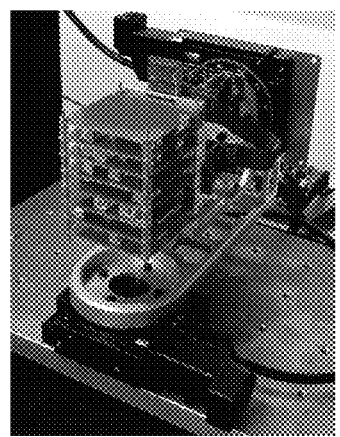

FIGS. 9A and 9B show a GALI detector layer composed of 13 units assembled on a PCB board (FIG. 9A), and a laboratory prototype, equipped with PETSys DAQ system (FIG. 9B). The assembly is installed on motorized axes, which allows automatic angle scanning.

Figure 10A:
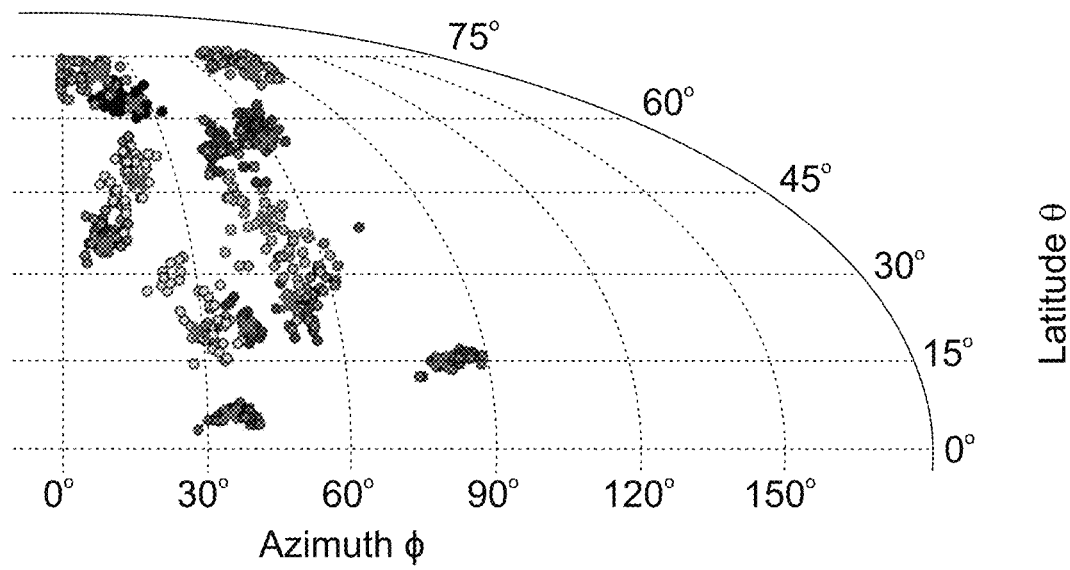
Figure 10B:
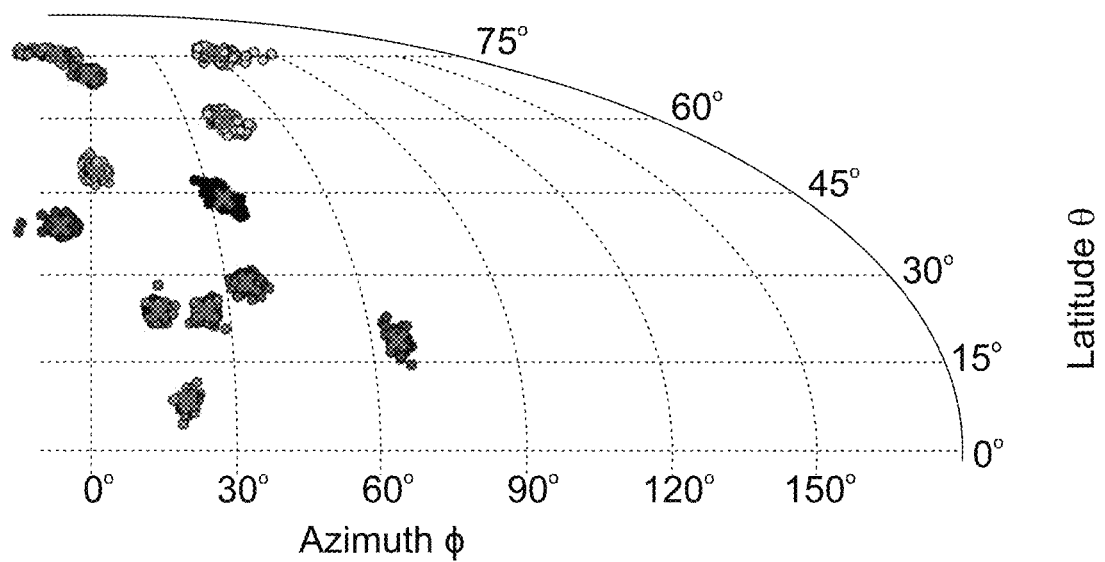

FIGS. 10A and 10B show a comparison between laboratory tests of the GTM (FIG. 10A) and a 90-scintillator GALI (FIG. 10B). The reconstructed direction of repeated 0.5 s bursts are plotted where each dot represents a burst. Dots are grouped by color according to the actual source direction, which is represented by a cross mark. The superior angular localization accuracy of the system of the present embodiments is evident.

Figure 11:
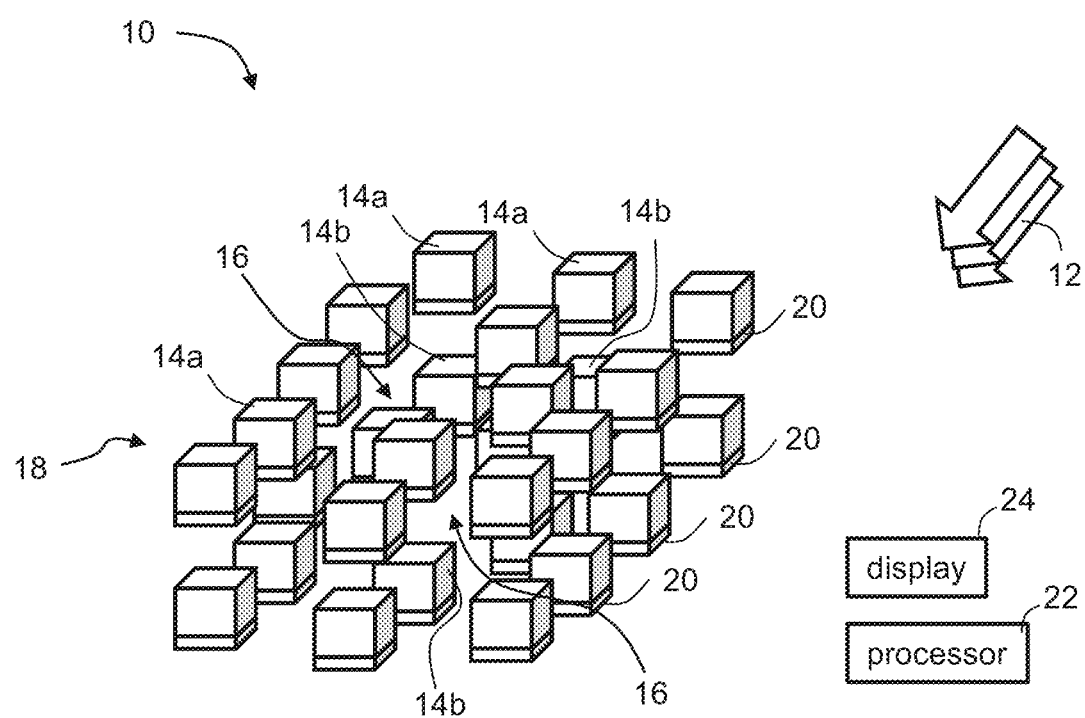

FIG. 11 illustrates a system for directional detection of radiation, according to some embodiments of the present invention.

DESCRIPTION OF SPECIFIC EMBODIMENTS OF THE INVENTION

The present invention, in some embodiments thereof, relates to radiation detection and, more particularly, but not exclusively, to a system and method for directional detection of radiation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The Inventors appreciate that PMTs are large, and cumbersome, and that they require high voltage, and are vulnerable to electromagnetic interference (EMI). The Inventors further appreciate that the traditional solutions, whereby relative count rates that arise from the different orientations of tile-shaped crystals are compared, limits the orientations and thus the directional capability, especially in view of the relatively large volume and weight of the PMT.

In a search for a solution to the above problems, the Inventors devised a detector system in which optical readout is achieved by means of solid state photomultipliers (e.g., SiPMs), and in which the directionality is inferred from mutual occultation among a multiplicity of scintillating crystals. Thus, each scintillating crystal serves both as a radiation detector element and as a mask for other scintillating crystals. The spectrum and direction of the radiation source can be calculated by considering the strength of the signal provided by each solid state photomultiplier, and the location of the respective crystal relative to other crystals.

The advantage of using solid-state photomultipliers according to some embodiments of the present invention is that they can be combined with crystals that are smaller compared to the traditional system, and in that such combination provides an overall overhead volume for the readout, which is smaller compared to the traditional system.

The system of the present embodiments is advantageous from the standpoint of its smaller gross size and mass compared to traditional systems. The advantage of the reduction in size allows for increase in efficiency for given volume and mass. The system of the present embodiments is advantageous from the standpoint of its improved sensitivity compared to traditional systems. Improved sensitivity allows detection of weaker sources, from further away, thus reducing human or instrument exposure.

Traditional directional radiation detector systems improve the accuracy by limiting the field-of-view of the detection system, thus mandate a trade-off between the field-of-view and its angular accuracy. Unlike traditional systems, the system of the present embodiments provides greater accuracy compared to traditional systems, while maintaining a wide field-of-view. The Inventors found, and experimentally verified, that since each of the crystals also serves, by itself, as a mask that limits the field-of-view for other crystals, both goals are successfully achieved, substantially without tradeoff. The use of crystals for masking allows maintaining full field-of-view without losing sensitivity, or adding weight for mask.

The system of the present embodiments can be used in many applications, including, without limitation, hand-held radiation detectors, autonomous radiation detectors, e.g., radiation detectors carried by robots, or unmanned aerial vehicle, or satellites. The system of the present embodiments detectors produces useful data for scientific, and medical applications.

For example, the system of the present embodiments can be used during a decontamination procedure, wherein the directionality of radiation can be detected by the system, and allow estimating a location of a radiation source, e.g., a radioactive material, for example, following a radiation accident.

The system of the present embodiments can also be used in the scientific community, for example, for the detection of cosmic gamma-ray explosions, including by global satellite coverage. In this context, the direction detection of the system of the present embodiments can be complemented by polarization measurements, which is achieved for high-energy photons interacting practically simultaneously with multiple scintillators, due to Compton scattering. The polarization can optionally and preferably be reconstruct based on the determined direction of the source and computed scattering probabilities.

The system of the present embodiments can also be used for medical imaging, for example, PET-CT. In these embodiments, the system of the present embodiments is employed as a radiation detector of a medical imaging system.

Referring now to the drawings, FIG. 11 illustrates a system 10 for directional detection of radiation 12, according to some embodiments of the present invention. Radiation 12 can be of any type that can propagate in vacuum, namely that does not require a medium in order to propagate. The radiation 12 is conveniently described as a flux of particles, wherein in this disclosure the term "particle" includes matter particles (e.g., electrons, positrons, protons, antiprotons, neutrons, atomic nuclei, atoms, ions, etc.), as well as quanta of electromagnetic waves known as photons or gamma particles. In particular preferred embodiments, the radiation 12 is selected from the group consisting of gamma radiation (namely radiations formed of photons), beta radiation (namely radiations formed of electrons or positrons), and alpha radiation (namely radiations formed of nuclei of helium-4).

System 10 comprises a three-dimensional arrangement 18 of scintillating crystals 14, with voids 16 between adjacent crystals, such that there are crystals 14a that are inner and crystals 14b that are outer within the arrangement 18. Both inner 14a and outer 14b scintillating crystals are responsive to the radiation 12. Preferably, scintillating crystals are selected such that the scintillating crystals emit optical signals in response to an interaction between radiation 12 and the scintillating crystals 14. Representative example of crystals that can be used, according to some embodiments of the present invention as scintillating crystals 14, including, without limitation, CsI(Tl), Ce: GAGG, NaI(Tl), LaBr$_3$(Ce), CeBr$_3$, and CLYC. Optionally, but not necessarily, one or more of scintillating crystals 14 is coated by a material which is reflective to radiation 12. The advantage of these embodiments is the reflective coating improves the collection of optical signals generated by crystals 14.

While the scintillating crystals 14 are shown as having a generally cuboid shape, this need not necessarily be the case, since, scintillating crystals 14 can have other shapes as well, for example, the shape of cylinder or a cone or a frustum or a cube or a polyhedron or any other shape. For example, one or more of the crystals can have a generally cubic shape (e.g., a six face polyhedron wherein the areas of all the faces are the same with tolerance of 20% or less). Further, although the scintillating crystals 14 are shown as having similar shapes, this need not necessarily be the case, since the present embodiments also contemplate configuration in which two or more of the scintillating crystals 14 have different shapes.

According to some embodiments of the invention each of at least a few of the crystals has a volumetric aspect ratio of less than about 3, more preferably less than about 2.5, more preferably less than about 2, more preferably less than about 1.5.

A volumetric aspect ratio of the crystal is defined as the ratio of the maximum cross sectional area passing through the centroid of the crystal divided by the minimum cross sectional area passing through the centroid. For some shapes, the maximum or minimum cross sectional area may be a plane tipped, angled, or tilted with respect to the external geometry of the shape. For example, a sphere would have a volumetric aspect ratio of 1, a cube has a volumetric aspect ratio of about 1.414, and so on.

According to some embodiments of the invention the largest diameter of at least a few of the crystals is less than 50 mm, more preferably less than 40 mm, more preferably less than 30 mm, more preferably less than 20 mm, more preferably less than 15 mm.

The arrangement 18 preferable includes at least 50, more preferably at least 60, more preferably at least 70, more preferably at least 80, more preferably at least 90, more preferably at least 100, more preferably at least 150, more preferably at least 200, more preferably at least 250, more preferably at least 300, more preferably at least 350 scintillating crystals, or more. The scintillating crystals 14 are preferably arranged and oriented such that at least a few scintillating crystals 14 interact with radiation 12 for any direction from which radiation 12 arrives. For example, the scintillating crystals 14 can be arranged randomly. In some embodiments of the present invention all scintillating crystals 14 have the same orientation. Alternatively, two or more of scintillating crystals 14 may have different orientations.

For crystals 14*b*, radiation 12 propagates within the voids 16 before interacting with those crystals. Since radiation 12 typically arrives from a defined direction in space, there are occultations among different crystals, and so the level of radiation 12 that eventually arrives at a particular crystal (inner or outer) depends on the extend of occultation that this particular crystal experiences for the defined direction from which radiation 12 arrives.

System 10 can further comprise a plurality of light sensors 20 coupled to crystals 14 for receiving the optical signals from crystals 14 and responsively generating electrical signals. Preferably, but not necessarily, one or more of the light sensors is a solid state photomultiplier, such as, but not limited to, a silicon photomultiplier. The number of light sensors 20 can be the same as the number of crystals 14 or it can differ therefrom. In the embodiment illustrated in FIG. 11, which is not to be considered as limiting, each light sensor 20 is optically coupled to one of the crystals 14. Alternatively, or additionally, two or more scintillating crystals 14 can be optically coupled to the same each light sensor 20, and/or two or more sensors 20 can be optically coupled to the same scintillating crystal 14. In some embodiments of the present invention all light sensors 20 are coupled to the respective scintillating crystals 14 at the same side. These embodiments are illustrated in FIG. 11. In various exemplary embodiments of the invention light sensors 20 are coupled to the scintillating crystals 14 at a side that is selected such that radiation 12 does not interact directly with light sensors 20. Alternatively, two or more light sensors 20 can be coupled to the respective scintillating crystals 14 at different sides.

In some embodiments of the present invention system 10 comprises a data processor 22 having a circuit configured for receiving an electrical signal separately from each light sensor 20. For clarity of presentation, communication channels between the individual sensors 20 and processor 22 are not shown. Processor 20 can include a circuit of a general purpose computer, or it can include a dedicated circuit.

The circuit of processor 22 is optionally and preferably configured for calculating a direction of radiation 12 based on relative intensities of the optical signals, as indicated by the electrical signals, and also based on mutual occultation among different crystals 14. For example, processor 22 can access a computer readable medium storing a library of distributions of intensities or reading counts, where the library associates each such library-distribution with a direction, for example, a direction that is characterized by two or three angles relative to a predefined coordinate system. Processor 22 can use the signals from sensors 20 to determine the distribution of intensities or reading counts among the crystals 14 and use the library to determine the direction of radiation 12. For example, processor 22 can apply a maximum likelihood procedure or the like on the entries of the library and use the results of the procedure to estimate the direction.

Processor 22 can thus search the library for library-distribution that best matches the determined distribution, and then determine that the direction of radiation 12 is the direction that is associated with the found library-distribution in the library. Processor 22 can, in some embodiments of the present invention, calculate the direction of radiation 12 also in cases in which no exact match is found in the library for the determined distribution among the signals from crystals 14 or sensors 20. For example, processor 22 can search the library for two or more library-distributions that satisfy a predetermined similarity criterion to the determined distribution, and execute an interpolation procedure among the directions that are associated with the found library-distributions. The predetermined similarity criterion can be a thresholding criterion. For example, processor 22 can calculate, for each of at least a portion of the library-distributions a discrepancy measure that characterizes the discrepancy between the determined distribution and the respective library-distribution, compare the calculated discrepancy measure to a predetermined threshold, and define each library-distributions for which the calculated discrepancy is less than the predetermined threshold, as a library-distribution that satisfies the predetermined similarity criterion.

The discrepancy measure can be of any known type, such as, but not limited to, a Kullback-Leibler distance, a $\chi^2$ distance, a Kolmogorov-Smirnov distance, and the like.

A library that associates directions to distributions of intensities or reading counts can be prepared in advance using a suitable directionality calibration procedure. The directionality calibration procedure can include a computer simulation that use the three-dimensional spatial distribution of crystals 14 within arrangement 18, that determine based on this spatial distribution mutual occultation among different crystals for each of a plurality of viewpoints relative to arrangement 18, and that estimate the distribution of intensities among the crystals based on the determined mutual occultation. A representative example of a computer simulation tool suitable for the present embodiments includes, without limitation, GEANT.

Alternatively, the directionality calibration procedure can include measurements by arrangement 18 of radiation emitted from each of a plurality of directions. As a representative example, which is not to be considered as limiting, arrangement 18 can be placed on a stage that is capable of assuming a plurality of different orientations (e.g., orientations characterized yaw, pitch, and/or roll angles), and a calibration radiation source can be placed at a distance from the stage. The radiation source can be activated to emit radiation, and a record describing the distribution of intensities of the crystals can be made for each orientation the stage is assuming. Preferably, the radiation calibration source is sufficiently distant from arrangement 18, for example, at least 10 times the largest dimension of arrangement 18. This is advantageous since it reduces skewedness due to near filed effects. radiation calibration source is preferably bright or be used with sufficiently long exposures, so as to ensure a sufficiently number of photons (e.g., at least 1000) per scintillating crystal. This is advantageous since it reduces statistical uncertainties.

In some embodiments of the present invention the circuit of processor 22 is configured for determining a spectrum of radiation 12. This can be done by accessing a computer-readable medium containing spectral calibration data for individual crystals within arrangement 18, and using the spectral calibration data for determining the spectrum of the radiation. The spectral calibration data of an individual crystal can include a lookup table that provides a relation between the intensity of the optical signal generated by the respective crystal and the energy of the radiation that interacts with it, where the energy is indicative of the spectrum of the radiation. The spectral calibration data can be prepared in advance for each individual crystal 14 within arrangement 18 by illuminating the respective crystal with calibrating radiation having known energy and making a spectral calibration record that corresponds to the known energy and that is indicative of the signal generated by the sensor that is optically coupled to that crystal. Such a procedure can be repeated for a plurality of different known energy levels and for each crystal 14 within arrangement 18, thus providing spectral calibration data for each crystal.

In some embodiments of the present invention the circuit of processor 22 subtracts contributions from background radiation before calculating the direction and/or spectrum of radiation 12. This can be done, for example, by subtracting from the signals components that are distributed substantially isotopically among crystals 14.

The results of the analysis performed by processor 22 can be transmitted by processor 22 to a computer readable medium or displayed on a display device 24.

System 10 can be used for decontaminating a region. In these embodiments, system 10 is operated to detecting radiation direction, and a radiation source is located based on the detected direction. The radiation source can then be isolated from the region or decontaminated as desired.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

The following examples describe a γ-ray detector system, which utilizes the mutual occultation between small scintillators to reconstruct the GRB direction. The Inventors built a prototype with 90 (9 mm)$^3$ CsI(Tl) scintillator cubes attached to silicon photomultipliers. The prototype tested with a 60 keV source demonstrates an angular accuracy of a few degrees for about 25 ph cm$^{-2}$ bursts. Simulations of realistic GRBs and background show that the achievable angular localization accuracy with a similar instrument occupying 1-l volume is less than 2°. The system of the present embodiments can be scaled to fit into small satellites, as well as large missions.

Introduction

Astrophysical Context

Astrophysical γ-ray Bursts (GRBs) are transient phenomena in high-energy astrophysics. Long GRBs, those lasting more than 2 s, are generally associated with supernovae, the explosion following the collapse of massive stars. Short GRBs, lasting less than 2 s, are associated with the coalescence of a neutron stars binary, and could also result from a merger of a NS and a black-hole binary.

Following the first discoveries of gravitational waves (GWs) from compact stellar mergers by Advanced LIGO (Laser Interferometer Gravitational-wave Observatory), the astrophysics community has concentrated its efforts on detecting their electromagnetic (EM) counterparts. The first direct detection of GWs by the two LIGO facilities occurred in September 2015. In August 2017 the European VIRGO detector joined the LIGO observation run. The combined detection by three interferometers potentially improves the event localization from more than a thousand square degrees to tens of square degrees, depending of course on the strength of the signal.

The first EM counterpart of a GW event was observed on 17 Aug. 2017. This LIGO-VIRGO GW event) was followed 1.7 s later by a short GRB (GRB 170817A) independently detected by the Fermi γ-ray Burst Monitor (GBM) and by IBIS on board INTEGRAL. Many other facilities around the world started to search for the site of the event in all possible wavebands. It took approximately 11 hours before the source was identified in the lenticular galaxy NGC 4993.

Increasing the number of simultaneously observed GW and EM counterparts is useful for addressing fundamental questions on the nature of coalescing neutron stars and black-holes. The method described in this Example can detect GRBs at high sensitivity and to identify their direction with high accuracy. Such capabilities allow fast follow-up with telescopes, and can also allow LIGO-VIRGO to search for sub-threshold events once the time and direction are known.

GRB Localization

A single soft γ-ray detector unit generally cannot identify the direction of incident photons. Angular localization of GRBs thus require multiple detectors. The coded-mask aperture method, most successfully implemented on Swift-BAT[9], is an array of detectors partially covered by a mask. The coded mask generates different shading patterns over the detectors array, varying with the source direction. This technique is currently used for the reconstruction of the direction of a GRB up to 20' (minutes of arc). However, the Inventors found that it requires a large detector area and volume due to the required separation between the mask and the array. Moreover, it has a limited field of view, and the mask blocks many of the source photons.

Another known method is a sparse array of scintillators, e.g., on Compton-BATSE[10] and Fermi-GBM[11], which are distributed over the spacecraft, each facing a different direction. The relative signals in each scintillator provide information about the direction of the source. For example, those facing the opposite direction are shielded by the satellite and have lower count rates. Angular localization of soft γ-ray sources can also be achieved if the detectors are far enough apart, as on different space crafts, and the different times of arrival can be discriminated[12]. Alternatively, direction reconstruction is possible if the detection is time-coincident with another observation of a different messenger (e.g. visible light), where better angular accuracy is available.

The GALI Concept

In traditional astrophysical y-ray detectors, scintillators are built with different cross-sections towards different directions to produce a gradually varying response with angle. These systems rely on the scintillators facing various orientations to reconstruct the direction of the source. The system described in this example is referred to as a g-ray-burst Localizing Instrument (GALI) and is different than the traditional detectors in that it exploits mutual occultation of small scintillators, distributed within a volume, to provide directional information.

The technique of the present embodiments relies on the entire array looking significantly different from different directions. Due to the occultation, the count rates from each scintillator varies as a function of the source direction, even for small angle differences.

Since there is typically a low count rate in each individual small scintillator, the system of the present embodiments optionally and preferably has a large number of scintillators. As in traditional approaches, the sensitivity to weak sources depends on the total size of the detecting volume.

FIGS. 1A and 1B show two prototype instruments demonstrating the differences between a traditional detector design and the system of the present embodiments. FIG. 1A shows a Gamma ray Transient Monitor (GTM) whose design is similar to the Fermi/GBM, and which has been described in [13]. FIG. 1B is the prototype system of the present embodiments, which is described in greater detail hereinunder.

In this Example, the system of the present embodiments is composed of (9 mm)$^3$ cubic scintillators. These are read out by Si Photo-Multipliers (SiPMs), which obviates the traditional, cumbersome, Photo-Multiplier Tubes (PMTs). Adopting such compact light sensors enables filling a volume with a large number of small detectors at the expense of the size of each individual one. An additional advantage of SiPMs over PMTs is their significantly lower operation voltage (tens of volt instead of hundreds).

Simulations

To check the performance of the system of the present embodiments simulations were executed using MEGAlib [14], a simulation software based on Geant4 [15]. In these simulations, all γ-ray interactions with scintillators are considered as counts in the relevant scintillator. Each simulation run is composed of two steps: A bright GRB with no background and the background simulation. The bright GRB simulation was used to estimate the average counts on each scintillator in the system with no background: a burst of 1000 ph·cm$^{-2}$, whose photon spectrum (dN/dE) is a band function (EQ. 1, below) with α=1.1, β=2.3 and $E_{peak}$=(2+α)$E_0$=266 keV.

$$\frac{dN(E)}{dE} = A \begin{cases} \left(\frac{E}{100 \text{ keV}}\right)^\alpha \exp\left(-\frac{E}{E_0}\right) & E \leq (\alpha - \beta)E_0 \\ \left[(\alpha - \beta)\frac{E_0}{100 \text{ keV}}\right]^{(\alpha-\beta)} \left(\frac{E}{100 \text{ keV}}\right)^\beta \exp(\beta - \alpha) & E > (\alpha - \beta)E_0 \end{cases} \quad \text{(EQ. 1)}$$

The simulations were repeated varying the angular coordinates at 5° intervals within the upper hemisphere. The average counts on each scintillator were then interpolated at either 0.5° or 1° intervals. The average counts were divided by the total number of counts for each burst to obtain the relative average counts on each scintillator. The result was an array of relative counts for each angle in the hemisphere.

The background simulation was based on various lower earth orbit (LEO) observations of hard X-rays and γ-rays and was included in the MEGAlib software package. Background caused by Leptonic and Hadronic components was not included, being estimated in simulation to be less than 1% of the photonic background, far less than the statistical uncertainty. The Hadronic background can optionally be simulated depending on the spacecraft platform which hosts the experiment.

After running the simulations, the directional capabilities of the system of the present embodiments were estimated. One-second bursts of 10 ph cm$^{-2}$ s$^{-1}$ from a given direction in the presence of the background were considered. The burst was generated using the aforementioned relative average counts by applying Poisson statistics to the expected average of each scintillator. The background was added with Poisson uncertainty. The burst direction was reconstructed using a cstat estimator between the generated counts and the simulated ones at each angle. The reconstructed direction is that which gives minimal cstat value. The burst generation and direction reconstruction process was repeated 100 times for each angle at 5° intervals so as to generate an accuracy map of the entire hemisphere.

The simulated systems were two different GALI systems: a random configuration of 90 (9 mm)$^3$ scintillator cubes spread in a 6×6×7 cm$^3$ volume and a configuration of 350 cubes in a 10×10×10 cm$^3$ volume. To compare the potential improvement of the accuracy of the system of the present embodiments with respect to traditional techniques, a GTM detector with four 3" diameter 1" thick cylindrical scintillators was also simulated. The GTM has similar effective area compared to the 350-scintillator version of the system of the present embodiments, but has approximately twice that of the 90-scintillator version of the system of the present embodiments. The simulated systems are shown in FIGS. 2A-C. The 90-scintillator version, which was also manufactured as a prototype system, contains the PCB boards upon which the detectors are mounted as in the prototype described below.

A small sample of the generated bursts' direction reconstructed by the three systems is shown in FIGS. 3A-B. The all-sky average deviation of the reconstructed source direction from the original source direction in each system is 13.1° for the GTM, 6.5° for a 90-scintillator version and 1.7° for the 350-scintillator version. From these simulations it is concluded that the localization accuracy of a system increases with the number of detectors, even when the effective area of the entire system is reduced.

Experimental Setup

Individual Detector Unit Characterization

A preliminary study was conducted to characterize single detector units in order to choose among different scintillating crystals, reflective wrappings and SiPM sensors. Each detector unit consists of a (9 mm)$^3$ cubic scintillator wrapped or coated by a reflective material and coupled to a SiPM using Cargille Meltmount [www(DOT)cargille(DOT)com/mounting-media] optical glue, which has a refractive index of 1.7.

Scintillating crystals of two kinds were selected for their high density and light yield, as well as their negligible intrinsic radioactivity: CsI(Tl) (see for example Balamurugan et al.) and Ce:GAGG. Both scintillators were polished by and purchased from Advatek [www(DOT)advatech-uk(DOT)co(DOT)uk]. The CsI(Tl) crystals were coated by sputtering a 50 nm thick layer of $SiO_2$, which protects the delicate and slightly hygroscopic crystal from mechanical degradation and water absorption. Since Ce:GAGG typically suffers from afterglow for hours after exposure to light due to lattice defects, it was kept in the dark so as not to alter the measurements. For space applications, the afterglow caused by electron and γ-ray dose is optionally considered.

γ-ray signals from the CsI(Tl) and Ce:GAGG crystals were read by a SensI J60035 SiPM [www(DOT)onsemi(DOT)com/pub/Collateral/MICROJ-SERIES-D.PDF] through a 10 kΩ resistor and recorded with an oscilloscope with 1 MΩ termination, and are shown in FIGS. 4A and 4B. In these measurements the SiPM was operated at a 27.2 V bias. The recorded voltage pulse is a convolution of the SiPM response function and the scintillation time evolution. For both crystals in the present configuration (RC~40 μs, given C~4 nF) the scintillation time is shorter than the circuit typical decay time. Therefore, the measured voltage is proportional to the integrated charge produced by the SiPM, and the peaks in FIGS. 4A and 4B corresponds to the end of the scintillation light production. The voltage recovery follows the circuit RC value. FIG. 4B shows the full Ce:GAGG light emission signal, which presents a fast component (~100 ns) and a slow tail (ending at ~500 ns) that can be distinguished by the signal slope change. FIG. 4B also shows that the CsI(Tl) light emission is much slower than the Ce:GAGG one. During the 500 ns in which the Ce:GAGG emission is completed, CsI(Tl) produces only ~40% of the total charge. In FIG. 4A the full CsI(Tl) signal is shown, reaching its maximum value within ~6 μs. Most existing integrated readout electronics have much shorter integration times, which may hinder the sensitivity of CsI (Tl) scintillators. Considering a readout electronics having ~1 μs integration time (like the TOFPET2 ASICs described below) use of Ce:GAGG is preferred for better signal-to-noise. From the standpoint of cost, use of CsI(Tl) is preferred.

Charge spectra produced by the two crystals were measured using an Ortec 671 spectroscopy amplifier with an Ortec Aspec-927 MCA. The amplifier shaping time was set to 0.5 μs for Ce:GAGG and to 3 μs for CsI(Tl) to include the full signal rise. The latter value is due to the signal shortening because of the low input impedance (465 Ω) of the amplifier. Spectra from a $^{137}Cs$ source from both scintillators are presented in FIG. 5. The ratio of the number of counts in the 662 keV peak between the two scintillators is ~2 in favor of Ce:GAGG, whereas for the 32 keV peak the ratio is comparable (taking into account the higher Compton baseline of Ce:GAGG). This indicates a higher detection efficiency of Ce:GAGG due to its higher density. On the other hand, it has been reported [27] that at low energies CsI(Tl) provides ~120% response with respect to the response at high energy while Ce:GAGG provides only ~85%. In conditions in which the signal to noise ratio is low, such as high temperature or high SiPM dark count rates (for example due to radiation damage), the noise threshold rises, so the advantage due to higher Ce:GAGG efficiency can be jeopardized. In general, the spectra peak positions result from a few factors: the crystal light yield, the SiPM gain and the effect of the amplifier.

The SiPM models that were considered are: SensI J60035 and Hamamatsu 14160-6050HS [www(DOT)Hamamatsu(DOT)com/resources/pdf/ssd/s14160_s14161_series_kapd10_64e.pdf]. Some features for the two kinds are summarized below in Table 1. The SensI J60035 SiPM has a 13.5 V lower breakdown voltage and a smaller cell size, which implies a linear response until higher gamma energies. On the other hand, Hamamatsu 14160-6050HS has lower dark current, which is useful, for example, for space applications. Additionally, according to vendor data the Hamamatsu 14160-6050HS has a ~10% enhanced PDE in the region above 450 nm, where the emission of both scintillators peaks.

TABLE 1

| Type | size [mm] | $V_{bd}$ [V] | max $I_{dark}$ [μA] | cell size [μm] | capacitance [nF] |
| --- | --- | --- | --- | --- | --- |
| SensI J60035 | 6 | 24.5 | 12 | 35 | 4 |
| Hamamatsu 14160-6050HS | 6 | 38 | 7.5 | 50 | 2 |

Another parameter considered in this Example is radiation hardness, meaning capability to withstand doses of highly ionizing particles with an acceptable performance degradation. Recent studies were published for Hamamatsu 14160-6050HS within the context of the CAMELOT mission [29]. One study shows that for Hamamatsu 14160-6050HS the performance degradation—in terms of dark current and noise threshold—due to 200 MeV protons recovers over time, as it undergoes an annealing process at room temperature [30]. Another study reports that heavy-ion irradiation causes an increased dark current and a worse energy resolution, but the effect is overall mild [31].

In this Example, Hamamatsu 14160-6050HS was selected for the prototype system.

Reflective materials of various kinds can be applied to the crystal faces in order to maximize the light collection from the crystal to the SiPM. The reflectors considered here are:

Teflon tape (diffusive), Ag—Al coating (specular), and 3M-Vikuiti™ enhanced specular reflector (ESR).

The Teflon tape is 80 µm thick and is typically winded a few times around the crystal, which is glued onto the SiPM, as shown in FIG. 6A. For simplicity, Teflon wrapping were discarded in this Example.

$SiO_2$-coated CsI(Tl) crystals were sputtered with a 200 nm Ag layer and then a more robust 200 nm Al layer on top of it. A 6 mm square area at the center of one cube face was left open to couple the SiPM. An example of such a unit is shown in FIG. 6B.

The Vikuiti ESR is a 65 µm thick film. It was laser-cut and glue (3M-9471) was applied to specific areas to keep it closed after folding. The wrapping process is illustrated in FIGS. 7A-D.

A comparison of a $^{137}Cs$ spectrum measured by a CsI(Tl) crystal coated with Ag and Al with one measured by a Vikuiti ESR wrapped crystal is presented in FIG. 8. From the ratio of the 662 keV peaks position, one can see that the light transport in the coated crystal results in a ~2.2 times lower signal than the Vikuiti ESR wrapped one. This is surprising, given the fact that both Ag and Al have a reflectivity higher than 90% in the CsI(Tl) spectral range. Without wishing to be bound to any particular theory, it is assumed that the cause is not a chemical reaction that alters the properties of the surface, since a similar experiment was repeated with a Ce:GAGG crystal obtaining similar results. For Vikuiti ESR wrapping there is a layer of air between the crystal and the reflector which causes internal reflection to take place.

Prototype

The prototype is a system of 90 detector units assembled in the way described above. Each CsI(Tl) crystal is coated with $SiO_2$, wrapped in Vikuiti ESR film and coupled to a Hamamatsu 14160-6050HS SiPM with optical glue. The detector units are arranged on 7 layers of standard FR4 PCB boards, each hosting 13 or 12 units. First, the SiPMs are soldered onto the PCBs, then the wrapped crystals are glued to them by means of a positioning jig. During the gluing stage the PCB and the glue dispenser are kept in an oven so that the glue melts.

An assembled layer is shown in FIG. 9A. The layers are then stacked by means of poly-carbonate rods and spacers and aluminum holders that allow mounting the entire stack on motorized axes for automatic angle scanning. On the back of the vertical axis a PETSys DAQ system is mounted [www(DOT)petsyselectronics(DOT)com]: a scalable readout based on the TOFPET2 ASICs. Each detector layer is connected to one of the two ASICs front-end boards through a PCB adapter. The front-end boards are connected to the DAQ through flat cables. Each ASIC has 64 channels independently connected to a single SiPM. On top of providing bias voltage to the SiPM, each channel integrates its output current and digitizes the integral whenever a threshold value is passed. The raw data are stored conveniently in a ROOT [www(DOT)root(DOT)cern(DOT)ch] tree for offline analysis. The data acquisition software can be controlled by python www(DOT)python(DOT)org scripts, as well as the rotating axes, so that the measurements are fully automated.

The entire assembly is shown in FIG. 9B. The assembly was installed in a thermally insulating dark box where back-fed peltier plates keep the inner temperature constant at 24±0.5° C. This allowed a stable gain of the SiPMs and of the DAQ.

Localization Measurements and Results

In order to test the direction reconstruction capabilities of the system of the present embodiments it was we exposed to a 10 mCi $^{241}Am$ source placed approximately 3.5 meters away to simulate a distant source. The effective flux of the 59.6 keV line at this distance is approximately 50 ph $cm^{-2}$ $s^{-1}$. The entire hemisphere was scanned by varying $\theta$ between 0 and 90° and $\phi$ between 0 and 360° with 5° intervals. For each angle two kinds of measurements were acquired. First a 60 s long exposure (corresponding to up to ~3000 counts on each scintillator), and then a series of 100 bursts 0.5 s long. Measurements were analyzed offline. The long measurements were used to define the spectrum region of interest for each detector unit, namely, $2\sigma$ region around the 59.6 keV Gaussian peak. The long measurements also provided the average counts in each detector at each angle. These were then interpolated at 0.5° intervals. The direction reconstruction accuracy of the bursts were then tested, similarly to the method described above for the computer simulations.

To quantify the advantages of the system of the present embodiments, it was compared to the traditional design used in the GTM. The results of the 90-scintillator version were compared to those obtained by a GTM prototype composed of four 6.35×6.35×2.54 $cm^3$ box NaI scintillators. For practical reasons the GTM experiment is limited to a quarter of the hemisphere. The GTM system was exposed to the source for 30 s. Due to the larger effective area of each scintillator, a 30 s exposure (corresponding to ≥50000 counts on each scintillator), was sufficient to establish the reference average counts. The GTM localization capabilities was tested using 50 bursts of ~0.5±0.05 s. This uncertainty in burst length is caused by limitations of the DAQ system (CAEN DT5724 [www(DOT)caen(DOT)it]). The GTM data were analyzed in a similar manner to the GALI data as described above.

A comparison between the performance of the GTM system and the 90-scintillator version of the system of the present embodiments is shown in FIGS. 10A and 10B for 12 different burst directions. As shown, the 90-scintillator version of the system of the present embodiments demonstrates better accuracy overall. The average error for the shown reconstructed bursts ranges between 1.3° and 2.8° for the 90-scintillator version and between 3° and 21° for the GTM. The system of the present embodiments performs strictly better in all measured directions. The improvement in accuracy reaches values greater than 50%, despite the significantly smaller total detecting volume of the system of the present embodiments, compared to the GTM.

Conclusions

These Examples demonstrated, both experimentally and using computer simulations, that the system of the present embodiments is able to localize bursts to high accuracy.

These Examples described a prototype consisting of 90 CsI(Tl) (9 mm)$^3$ cubes stacked in 7 layers, but other sizes, number of CsI(Tl) and materials are also contemplated according to some embodiments of the invention.

These Examples described a configuration that detects $\gamma$ radiation, but other types of radiation, including, without limitation, $\alpha$ radiation, $\beta^-$ radiation and $\beta^+$ radiation are also contemplated according to some embodiments of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

[1] Blinnikov et al., Pisma v Astromicheskii Zhurnal 10 pp. 422-428, 1984.
[2] Paczynski, et al. The Astrophysical Journal 308, pp. L43-L46, 1986.
[3] Mochkovitch et al., Nature 361(6409), pp. 236-238, 1993
[4] Abbott et al., Physical review letters 116(6), p. 061102, 2016.
[5] Abbott et al., Physical review letters 119(14), p. 141101, 2017.
[6] Abbott, et al., Physical Review Letters 119(16), p. 161101, 2017.
[7] Abbott et al., The Astrophysical Journal Letters 848(2), p. L13, 2017.
[8] Abbott et al., Astrophysical Journal. Letters 848(2), p. L12, 2017.
[9] Barthelmy et al., Space Science reviews 120(3-4), pp. 143-164, 2005.
[10] Fishman et al., in 19th International Cosmic Ray Conference (ICRC19), Volume 3, International Cosmic Ray Conference 3, 343-346, 1985.
[11] Meegan et al., The Astrophysical Journal 702(1), p. 791, 2009.
[12] Fiore et al., in Space Telescopes and Instrumentation 2018: Ultraviolet to Gamma Ray, J.-W. A. den Herder, S. Nikzad, and K. Nakazawa, eds., 10699, International Society for Optics and Photonics, SPIE, 2018.
[13] Yacobi et al., in Space Telescopes and Instrumentation 2018: Ultraviolet to Gamma Ray, J.-W. A. den Herder, 10699, pp. 1417-1424, International Society for Optics and Photonics, SPIE, 2018.
[14] Zoglauer et al., New Astronomy Reviews 50(7-8), pp. 629-632, 2006.
[15] Agostinelli et al., Nuclear instruments and methods in physics research section A: Accelerators, Spectrometers, Detectors and Associated Equipment 506(3), pp. 250-303, 2003.
[16] Band et al., The Astrophysical Journal 413, pp. 281-292, 1993.
[17] Gruber et al., The Astrophysical Journal 520(1), p. 124, 1999.
[18] Mizuno et al., The Astrophysical Journal 614(2), p. 1113, 2004.
[19] Ajello et al., The Astrophysical Journal 689(2), p. 666, 2008.
[20] Abdo et al., Physical Review D 80(12), p. 122004, 2009.
[21] Turler et al., Astronomy & Astrophysics 512, p. A49, 2010.
[22] W. Cash, The Astrophysical Journal 228, pp. 939-947, 1979.
[23] Balamurugan et al., Journal of crystal growth 286(2), pp. 294-299, 2006.
[24] Kamada et al., Journal of Crystal Growth 352(1), pp. 88-90, 2012.
[25] Yoneyama et al., Journal of Instrumentation 13(02), p. P02023, 2018.
[26] Spanoudaki and Levin, Optics express 19(2), pp. 1665{1679, 2011.
[27] Sibczynski et al., Nukleonika 62(3), pp. 223-228, 2017.
[28] Yamamoto et al., in Proceedings of the 5th International Workshop on New Photon-Detectors (PD18), p. 011001, 2019.
[29] Ripa et al., Astronomische Nachrichten 340(7), pp. 666-673, 2019.
[30] Hirade et al., Nuclear Instruments and Methods in Physics Research A 986, p. 164673, 2021.
[31] Link et al., in 36th International Cosmic Ray Conference (ICRC2019), International Cosmic Ray Conference 36, p. 96, 2019.

What is claimed is:

1. A system for directional detection of radiation, comprising:
a plurality of scintillating crystals, responsive to the radiation and being arranged three-dimensionally, with voids between adjacent crystals, such that there are crystals that are inner and crystals that are outer within said arrangement;
a plurality of light sensors coupled to said crystals for receiving optical signals from said crystals and responsively generating electrical signals; and
a data processor having a circuit configured for receiving an electrical signal separately from each light sensor, and calculating at least a direction of the radiation based on relative intensities of said signals and mutual occultation among different crystals.

2. The system according to claim 1, wherein at least one of said light sensors is a solid state photomultiplier.

3. The system according to claim 1, wherein each of at least a few of said crystals has a volumetric aspect ratio of less than 3.

4. The system according to claim 1, wherein at least a few of said crystals have a generally cubic shape.

5. The system according to claim 1, wherein a largest diameter of at least a few of said crystals is less than 50 mm.

6. The system according to claim 1, comprising at least 50 scintillating crystals.

7. The system according to claim 1, wherein at least one of said crystals is at least partially coated by a material that is reflective to the radiation.

8. The system according to claim 1, wherein each scintillating crystal is coupled to one light sensor.

9. The system according to claim 1, wherein each scintillating crystal is coupled to more than one light sensor.

10. The system according to claim 1, wherein at least one of said scintillating crystals is selected from the group consisting of CsI(Tl), Ce: GAGG, NaI(Tl), $LaBr_3$(Ce), $CeBr_3$, and CLYC.

11. The system according to claim 1, wherein at least one of said solid state photomultipliers comprises a silicon photomultiplier.

12. The system according to claim 1, wherein said circuit of said data processor is also configured for determining a spectrum of the radiation.

13. The system according to claim 1, wherein said scintillating crystals are responsive to gamma radiation.

14. The system according to claim 1, wherein said scintillating crystals are responsive to beta radiation.

15. The system according to claim 1, wherein said scintillating crystals are responsive to alpha radiation.

16. A medical imaging system, comprising the system according to claim 1.

17. An autonomous radiation detector, comprising an autonomous vehicle and the system according to claim 1.

18. The system according to claim 1, being mounted on a satellite.

19. A method of decontaminating a region, comprising:
detecting radiation direction using a directional radiation detection system,
locating a radiation source based on said direction, and
decontaminating or isolating said radiation source;
wherein said directional radiation detection system comprises:
a plurality of scintillating crystals, responsive to the radiation and being arranged three-dimensionally, with voids between adjacent crystals, such that there are crystals that are inner and crystals that are outer within said arrangement; and
a plurality of light sensors coupled to said crystals for receiving optical signals from said crystals and responsively generating electrical signals;
wherein said detecting said radiation direction comprises receiving an electrical signal separately from each light sensor, and calculating at least a direction of the radiation based on relative intensities of said signals and mutual occultation among different crystals.

20. The method of claim 19, wherein said calculating said direction comprises accessing a computer readable medium storing a library of library-distributions of signal intensities, wherein said library associates each library-distribution with a direction, and using said library to determine said direction.

* * * * *